US010293859B2

(12) United States Patent
Kiyoshita et al.

(10) Patent No.: US 10,293,859 B2

(45) Date of Patent: May 21, 2019

(54) SIDE VEHICLE-BODY STRUCTURE OF VEHICLE

(71) Applicant: MAZDA MOTOR CORPORATION, Hiroshima (JP)

(72) Inventors: Daisuke Kiyoshita, Hiroshima (JP); Toshiharu Ikeda, Hiroshima (JP); Ken Fujimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/801,015

(22) Filed: Nov. 1, 2017

(65) Prior Publication Data

US 2018/0237073 A1 Aug. 23, 2018

(30) Foreign Application Priority Data

Feb. 21, 2017 (JP) ................................ 2017-030274

(51) Int. Cl.

*B62D 21/15* (2006.01)
*B62D 25/04* (2006.01)
*B62D 27/02* (2006.01)
*B62D 29/00* (2006.01)

(52) U.S. Cl.

CPC ........... *B62D 21/157* (2013.01); *B62D 25/04* (2013.01); *B62D 27/023* (2013.01); *B62D 29/008* (2013.01)

(58) Field of Classification Search

CPC .............................. B62D 21/157; B62D 25/04
USPC ............... 296/193.66, 187.1, 187.09, 193.06
See application file for complete search history.

(56) References Cited

U.S. PATENT DOCUMENTS

| | | | | |
|---|---|---|---|---|
| 6,698,823 B2 * | 3/2004 | Kim | B62D 25/04 296/203.01 |
| 7,140,674 B2 * | 11/2006 | Miyoshi | B62D 25/04 296/203.03 |
| 8,651,563 B2 * | 2/2014 | Mildner | B62D 25/04 296/192 |
| 2003/0102697 A1 * | 6/2003 | Yakata | B62D 25/02 296/209 |
| 2018/0273100 A1 * | 9/2018 | Kim | B62D 21/157 |

FOREIGN PATENT DOCUMENTS

JP 2006-193001 A 7/2006

* cited by examiner

*Primary Examiner* — Jason S Morrow

(74) *Attorney, Agent, or Firm* — Studebaker & Brackett PC

(57) ABSTRACT

In a structure which comprises a hinge pillar at a side face portion of a vehicle, a front pillar connected to the hinge pillar, an apron member extending forward from a joint portion of the hinge pillar to the front pillar, and a hinge pillar reinforcement provided at the joint portion of the hinge pillar to the front pillar, a reinforcing member which connects a side face portion and an upper face portion of the hinge pillar reinforcement is provided, and a bead portion which interconnects the upper face portion and the side face portion of the hinge pillar reinforcement in a brace shape is provided and the reinforcing member.

8 Claims, 8 Drawing Sheets

SIDE VEHICLE-BODY STRUCTURE OF VEHICLE

BACKGROUND OF THE INVENTION

The present invention relates to a side vehicle-body structure of a vehicle which considers a load inputted from a vehicle forward side and belongs to a technical field of a vehicle-body structure.

In a vehicle, such as an automotive vehicle, at a forward side portion of a vehicle body are provided a hinge pillar extending in a vertical direction and supporting a front door, a front pillar extending upward from an upper end portion of the hinge pillar, and an apron member extending forward from a joint portion of the both pillars. Herein, the vehicle is configured such that when a large load is inputted from the vehicle forward side, this load is dispersed and transmitted to the both pillars from the apron member.

However, this structure has the following problem. That is, when the load is inputted, a joint portion of the hinge pillar to the front pillar, where a lower end portion of the apron member is joined, is sunk downward in accordance with folding deformation in which a vehicle-body forward-side portion of the apron member is lifted upward. Consequently, the front pillar is folded and deformed, which may influence a cabin inside badly.

The following countermeasures against this problem may be considered. That is, the rigidity of the joint portion of the hinge pillar to the front pillar is increased by providing a reinforcement at the joint portion of the upper end of the hinge pillar to the lower end portion of the front pillar or providing a vertical reinforcing structure combined with a reinforcement beam steering at an upper end portion of a front pillar lower, which corresponds to the hinge pillar, as shown in Japanese Patent Laid-Open Publication No. 2006-193001. Thereby, the load from the vehicle forward side may be effectively dispersed to the hinge pillar and the front pillar, so that the above-described deformation may be suppressed.

However, since the upper end portion of the front pillar lower is reinforced by plural parts in the structure of the above-described patent document, there is still room for improvement in terms of the weight.

SUMMARY OF THE INVENTION

Accordingly, an object of the present invention is to further improve a reinforcing structure of the hinge pillar in order to properly suppress the folding deformation of the front pillar, contributing to the weight reduction. Specifically, the present invention provides a vehicle-body structure which can properly suppress the above-described deformation of the joint portion of the hinge pillar to the front pillar being sunk downward and the above-described folding deformation of the front pillar which are caused by the folding deformation in which the vehicle-body forward-side portion of the apron member is lifted upward in the case of the load being inputted from the vehicle forward side, and properly transmit the load inputted from the apron member to the above-described both pillars.

The present invention is a side vehicle-body structure of a vehicle, comprising a hinge pillar provided at a side face portion of a vehicle body and extending in a vertical direction, a front pillar extending upward from an upper end portion of the hinge pillar, an apron member extending forward from a joint portion of the hinge pillar to the front pillar, and a pillar reinforcement provided at the joint portion of the hinge pillar to the front pillar, wherein the pillar reinforcement is formed in a roughly L shape by a side face portion extending vertically and an upper face portion extending toward a cabin side from an upper end of the side face portion, and a reinforcing member which connects the upper face portion and the side face portion of the pillar reinforcement is provided.

According to the present invention, the reinforcing member is provided at the pillar reinforcement in the structure which comprises the hinge pillar provided at the side face portion of the vehicle body, the front pillar connected to the upper end portion of the hinge pillar, the apron member extending forward from the joint portion of the hinge pillar to the front pillar, and the pillar reinforcement provided at the joint portion of the hinge pillar to the front pillar. Accordingly, the rigidity, in the vertical direction, of the pillar reinforcement can be improved.

Further, the reinforcing member connects the roughly L-shaped upper face and side face portions provided at the pillar reinforcement. Herein, in a case where the reinforcing member is provided only at the side face portion of the pillar reinforcement, for example, the rigidity, in the vertical direction, of the pillar reinforcement is improved. Since the side face portion of the pillar reinforcement follows the deformation of the upper face portion of the pillar reinforcement, the pillar reinforcement tends to be easily deformed in a vehicle-body width direction. According to the present invention in which the reinforcing member connects the roughly L-shaped upper face and side face portions provided at the pillar reinforcement, however, the rigidity against the deformation, in the vehicle-body width direction, of the pillar reinforcement can be improved in addition to the increase of the vertical direction of the pillar reinforcement.

Thereby, since it is suppressed that the joint portion of the pillar reinforcement to the front pillar is sunk downward when the load inputted from the vehicle forward side, thereby suppressing the folding deformation of the front pillar, the load inputted from the apron member can be effectively dispersed to the hinge pillar and the front pillar. Further, since the folding deformation of the front pillar is suppressed, the bad influence on the cabin inside can be suppressed.

In an embodiment of the present invention, the reinforcing member has a high-rigidity portion which interconnects the upper face portion and the side face portion of the pillar reinforcement in a brace shape.

According to this embodiment, the reinforcing member has the high-rigidity portion which interconnects the upper face portion and the side face portion of the pillar reinforcement in the brace shape, so that this high-rigidity portion functions against the load input which performs such that the upper face portion of the pillar reinforcement is sunk downward when the load is inputted from the vehicle forward side. Accordingly, the above-described effect of the present invention can be more effectively attained (obtained).

In another embodiment of the present invention, the high-rigidity portion of the reinforcing member is a bead portion which interconnects the upper face portion and the side face portion of the pillar reinforcement in the brace shape.

According to this embodiment, since the high-rigidity portion of the reinforcing member is the bead portion interconnecting the upper face portion and the side face portion of the pillar reinforcement in the brace shape, the effect of the above-described embodiment can be concretely attained.

In another embodiment of the present invention, the high-rigidity portion of the reinforcing member is a thick portion which interconnects the upper face portion and the side face portion of the pillar reinforcement in the brace shape.

According to this embodiment, since the high-rigidity portion of the reinforcing member is the thick portion interconnecting the upper face portion and the side face portion of the pillar reinforcement in the brace shape, the effect of the above-described embodiment can be concretely attained similarly to the above.

In another embodiment of the present invention, the side face portion of the pillar reinforcement has a flat face portion, and the reinforcing member comprises a flat-face joint portion which is joined to the flat face portion of the pillar reinforcement.

According this embodiment, since the side face portion of the pillar reinforcement has the flat face portion and the flat face portion of the pillar reinforcement and the flat-face joint portion of the reinforcing member are joined together, the rigidity of the flat face portion which is even and has a low surface rigidity (facial rigidity) can be effectively improved. Consequently, it can be suppressed that the flat face portion of the pillar reinforcement which has the low surface rigidity becomes a trigger of the above-described deformation for the input of the load which causes deformation of the pillar reinforcement in which the side face portion of the pillar reinforcement protrudes toward an inside of the cabin when the load is inputted from the vehicle forward side.

Other features, aspects, and advantages of the present invention will become apparent from the following description which refers to the accompanying drawings.

DETAILED DESCRIPTION OF THE INVENTION

Hereafter, a side vehicle-body structure of a vehicle according to an embodiment of the present invention will be described. Herein, while a vehicle right side of the side vehicle-body structure will be described, a vehicle left side of the side vehicle-body structure is similar to the vehicle right side of the side vehicle-body structure.

Figure 1:
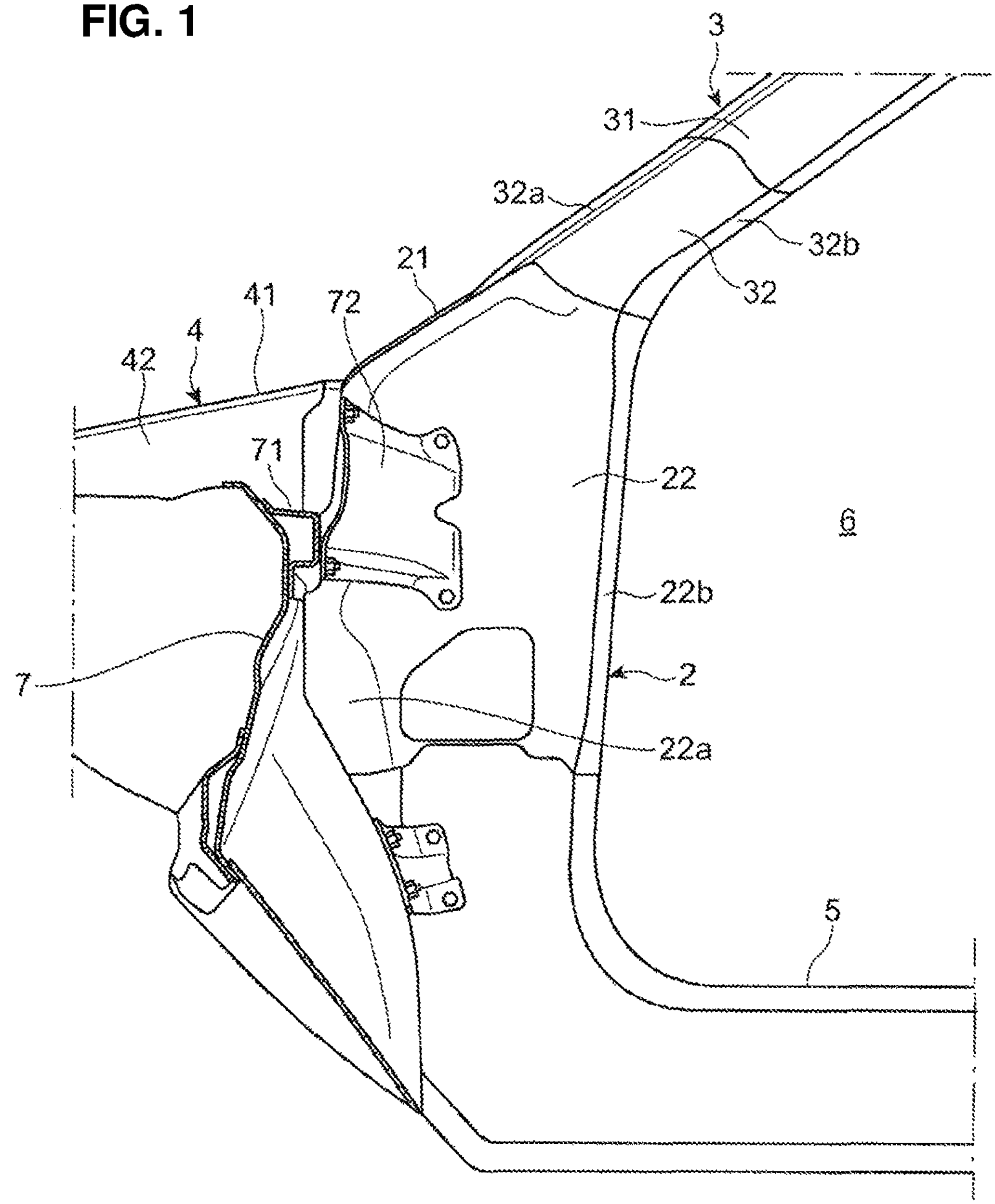
FIG. 1 is a side view of a side vehicle-body structure of a vehicle according to an embodiment of the present invention, when viewed from an inside of a cabin.

As shown in FIG. 1, a forward side portion of a vehicle body 1 comprises right-and-left hinge pillars 2, 2 which extend in a vertical direction and support respective front doors, right-and-left front pillars 3, 3 which extend rearward and upward from respective upper end portions of the right-and-left hinge pillars 2, 2, right-and-left apron members 4, 4 which extend forward from respective upper front end portions of the right-and-left hinge pillars 2, 2, and right-and-left side sills 5, 5 which extend rearward from respective lower end portions of the right-and-left hinge pillars 2, 2. Respective front edge portions of right-and-left front door openings 6, 6 are formed by the above-described members.

A dash panel 7 which partitions a cabin from an engine room is arranged between the right-and-left hinge pillars 2, 2. A dash cross member 71 which has a hat-shaped cross section is joined to an inward side face of the dash panel 7 for improving the rigidity of the dash panel 7. Further, a dash gusset 72 which interconnects the dash panel 7 and the hinge pillar 2 in the brace shape is provided in a corner portion between the dash panel 7 and the hinge pillar 2.

The hinge pillar 2 comprises a cab side outer panel 21 which forms a vehicle outward-side face of the hinge pillar 2 and a hinge pillar inner panel (hereafter, referred to as "hinge pillar inner") 22 which forms a vehicle inward-side face of the hinge pillar 2.

Figure 2:
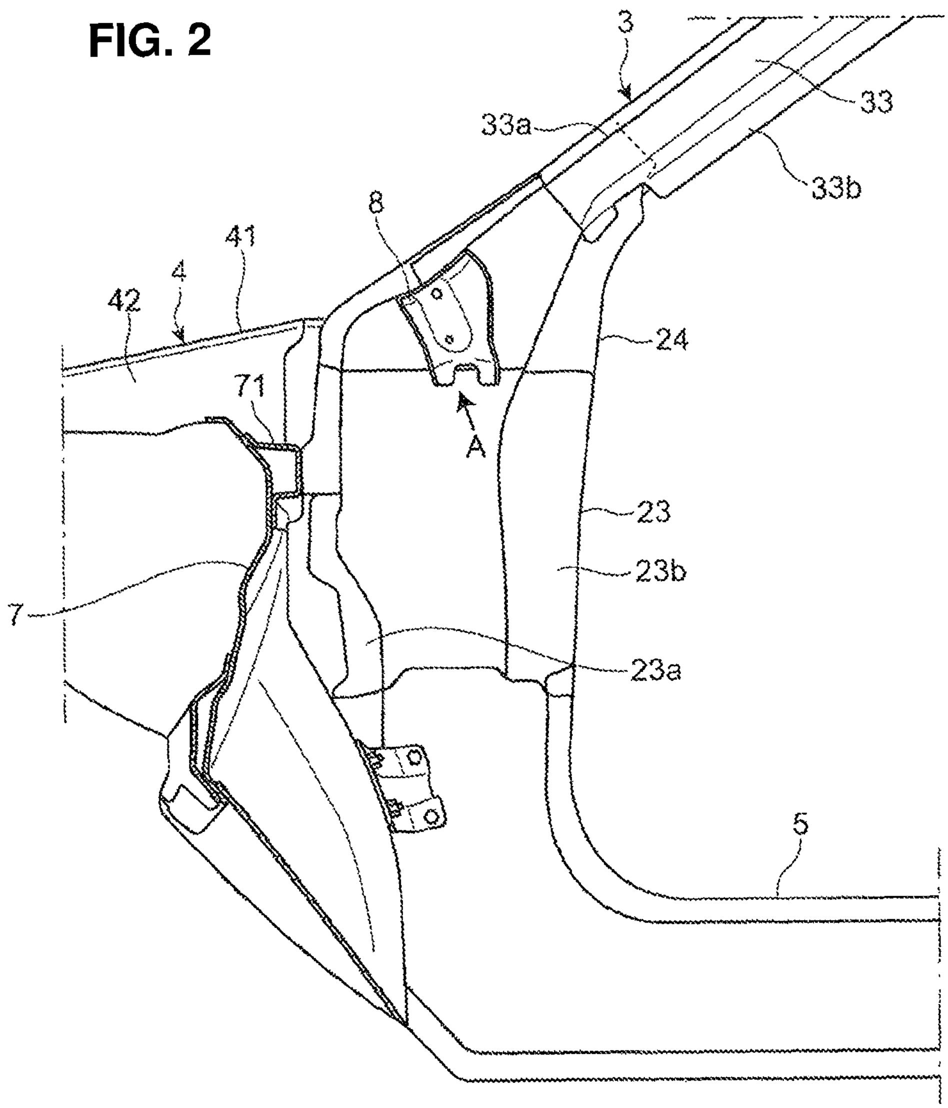
FIG. 2 is a view of a state of the side vehicle-body structure in which a hinge pillar inner panel and a front pillar inner are removed, which corresponds to FIG. 1.

FIG. 2 shows the side vehicle-body structure in which the hinge pillar inner 22 and a front pillar inner 32, which are shown in FIG. 1, are removed. As shown in FIG. 2, between the cab side outer panel 21 and the hinge pillar inner 22 are provided a hinge pillar outer panel (hereafter, referred to as "hinge pillar outer") 23 which is configured to be close to or contact an inward-side face, in the vehicle-body width direction, of the cab side door outer panel and a hinge pillar reinforcement 24 which corresponds to a pillar reinforcement in the claims. Herein, the hinge pillar outer 23 and the hinge pillar reinforcement 24 are arranged such that they are continuous in a vehicle-body vertical direction, and an upper end portion of the hinge pillar outer 23 and a lower end portion of the hinge pillar reinforcement 24 are joined to each other.

Respective front flange portions 22*a*, 23*a* and respective rear flange portions 22*b*, 23*b* of the hinge pillar inner 22 and the hinge pillar outer 23 are welded together, so that a hollow closed cross-section structure is provided to extend vertically.

Figure 3:
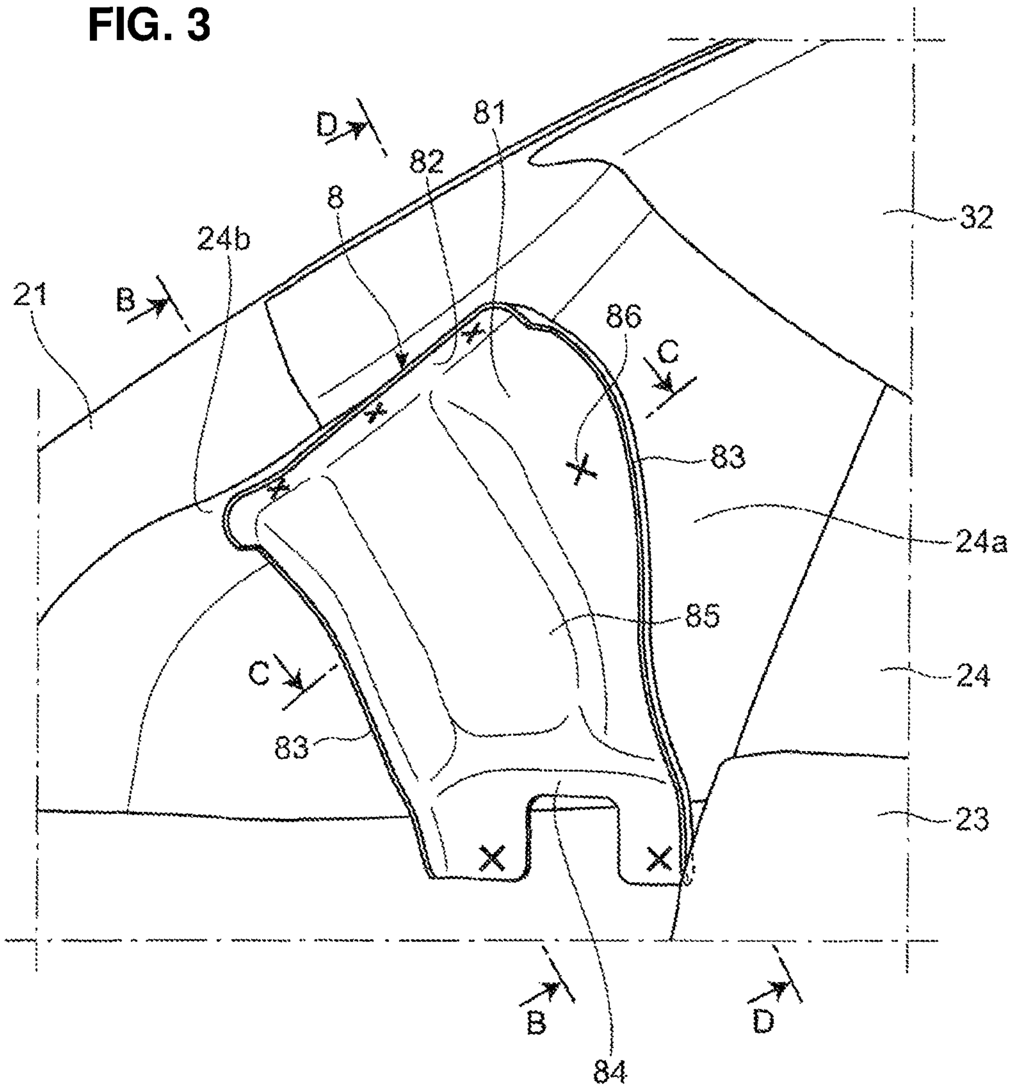
FIG. 3 is a perspective view of a major part of a surrounding area of a reinforcing member, when viewed in an arrow A direction in FIG. 2.
Figure 5:
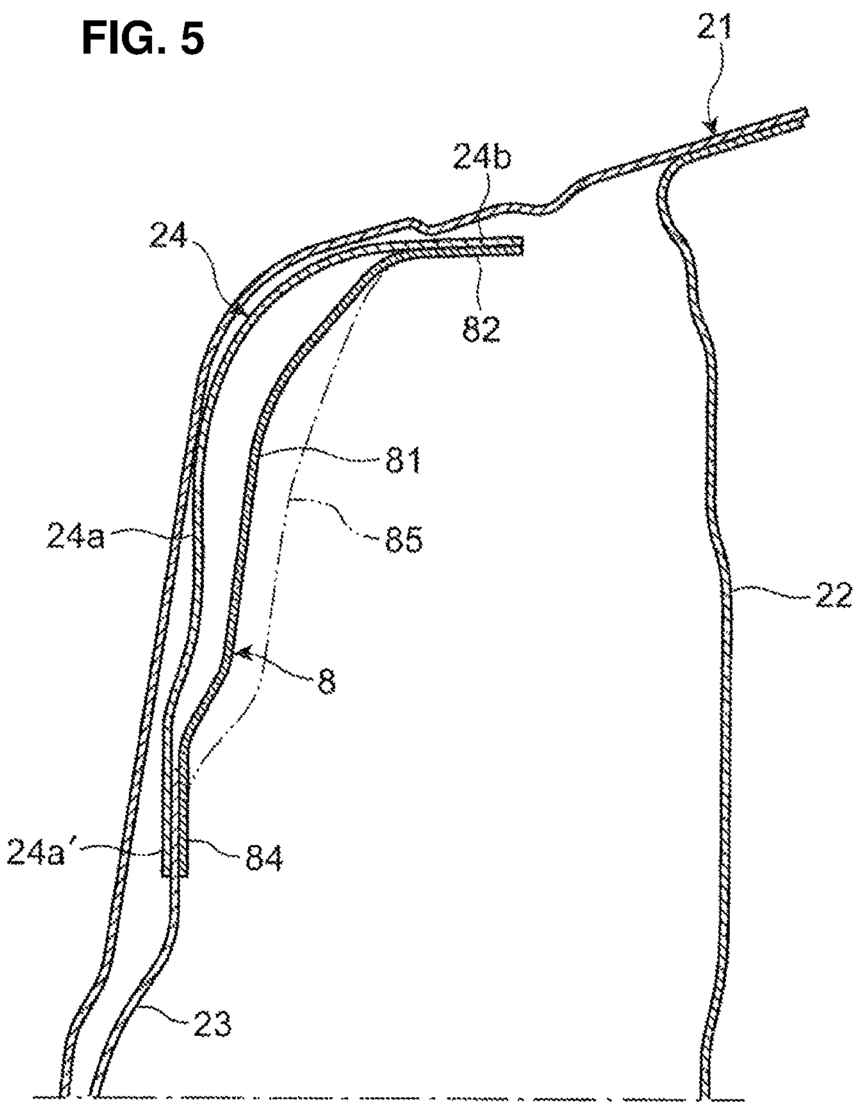
FIG. 5 is a sectional view taken along line B-B of FIG. 3.

As shown in FIGS. 3 and 5, the hinge pillar reinforcement 24 is configured in a roughly L shape, which is formed by a side face portion 24*a* which extends vertically and an upper face portion 24*b* which extends from an upper end portion of the side face portion 24*a* toward the cabin side, and the upper face portion 24*b* of the hinge pillar reinforcement 24 and the cab side outer panel 21 are welded together.

The front pillar 3 comprises a cab side outer panel 31 which forms a vehicle outward-side face of the front pillar 3, a front pillar inner panel (hereafter, referred to as "front pillar inner") 32 which forms an vehicle inward-side face of the front pillar 3 as shown in FIG. 1, and a front pillar outer panel (hereafter, referred to as "front pillar outer") 33 which is provided between the both panels 31, 32 and configured to be close to or contact an inward-side face, in the vehicle-body width direction, of the cab side outer panel 31 as shown in FIG. 2. Respective upper face portions 32*a*, 33*a* and respective lower flange portions 32*b*, 33*b* of the front pillar inner 32 and the front pillar outer 33 are welded together, so that a hollow closed cross-section structure is provided to extend vertically.

A lower end portion of the front pillar outer 33 and an upper end portion of the hinge pillar reinforcement 24 are joined to each other, and a lower end portion of the front pillar inner 32 and an upper end portion of the hinge pillar inner 22 are joined to each other. Thereby, the hinge pillar 2 and the front pillar 3 are joined. Herein, the cab side outer panel 21 of the hinge pillar 2 and the cab side outer panel 31 of the front pillar 3 are formed by a continuous side panel.

Further, the apron member 4 comprises an apron member outer 41 which forms a vehicle outward-side face of the apron member 4 and an apron member inner 42 which forms a vehicle inward-side face of the apron member 4. The apron member outer 41 and the apron member inner 42 are welded together, so that a hollow closed cross-section structure is provided to extend in a vehicle-body longitudinal direction.

The hinge pillar 2 and the apron member 4 are joined together by joining a rear end portion of the apron member outer 41 to a front end portion of the hinge pillar reinforcement 24 and an upper front end portion of the hinge pillar outer 23 via the cab side outer panel 21 such that the rear end portion of the apron member outer 41 is positioned between the hinge pillar reinforcement 24 and the hinge pillar outer 23.

In addition to the above-described structure, a reinforcing structure is provided in the present embodiment. The reinforcing structure at a joint portion of the hinge pillar 2 to the front pillar 3 will be described.

As shown in FIG. 2, this reinforcing structure is configured such that a roughly-L shaped reinforcing member 8 is provided between a joint portion of the hinge pillar reinforcement 24 to the apron member 4 and another joint portion of the hinge pillar reinforcement 24 to the front pillar 3 at a position which is located at a roughly central portion in the vehicle-body longitudinal direction and on an inward side in the vehicle-body width direction. Specifically, as shown in FIG. 3, the reinforcing member 8 is joined so as to interconnect the side face portion 24*a* and the upper face portion 24*b* of the hinge pillar reinforcement 24.

Hereafter, the above-described reinforcing member 8 will be described specifically referring to FIGS. 3-6.

Figure 4:
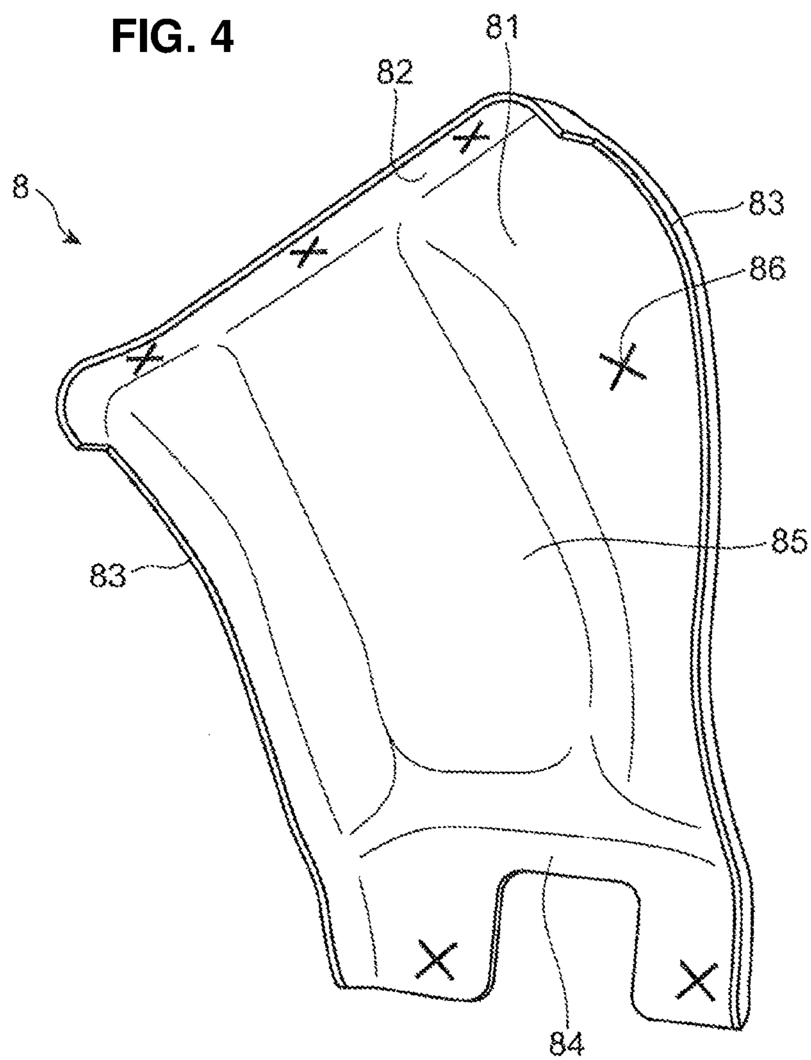
FIG. 4 is a perspective view of the reinforcing member according to the embodiment of the present invention.

As shown in FIG. 4, the reinforcing member 8 comprises a base face portion 81 and an upper face portion 82 which rises from an upper end portion of the base face portion 81 roughly vertically, which is configured in a roughly L shape by these portions 81, 82. Further, flange portions 83, 83 are provided at both sides, in the vehicle-body longitudinal direction, of the base face portion 81, which rise toward the cabin side. The flange portions 83, 83 and the above-described upper face portion 82 are configured to be a continuous face.

A bead portion 85 which protrudes toward the cabin side is formed at a portion of the base face portion 81 of the reinforcing member 8 which is located between the both-side flange portions 83, 83 of the reinforcing member 8 over an area from the upper face portion 82 of the reinforcing member 8 to the lower end portion 84 of the reinforcing member 8.

As shown in FIGS. 3 and 5, the lower end portion 84 of the reinforcing member 8 is welded to a continuous portion of a lower end portion 24*a'* of the side face portion 24*a* of the hinge pillar reinforcement 24 and the upper end portion of the hinge pillar outer 23, and also the upper face portion 82 of the reinforcing member 8 and the upper face portion 24*b* of the hinge pillar reinforcement 24 are welded together, so that the rigidity of the hinge pillar reinforcement 24 is improved.

Further, as described above, the bead portion 85 of the reinforcing member 8 is provided to protrude toward the cabin side between a joint portion of the upper face portion 82 of the reinforcing member 8 to the upper face portion 24*b* of the hinge pillar reinforcement 24 and a joint portion of the lower end portion 84 of the reinforcing member 8 to the lower end portion 24*a'* of the side face portion 24*a* of the hinge pillar reinforcement 24. Thereby, the bead portion 85 of the reinforcing member 8 receives, in a brace manner, the load inputted to the upper face portion 24*b* of the hinge pillar reinforcement 24, for example. Thus, the rigidity of the hinge pillar reinforcement 24 against the load inputted to the upper face portion 24*b* of the hinge pillar reinforcement 24 is increased, so that a sectional collapse, in a vehicle front view, of the hinge pillar reinforcement 24 is suppressed.

Figure 6:
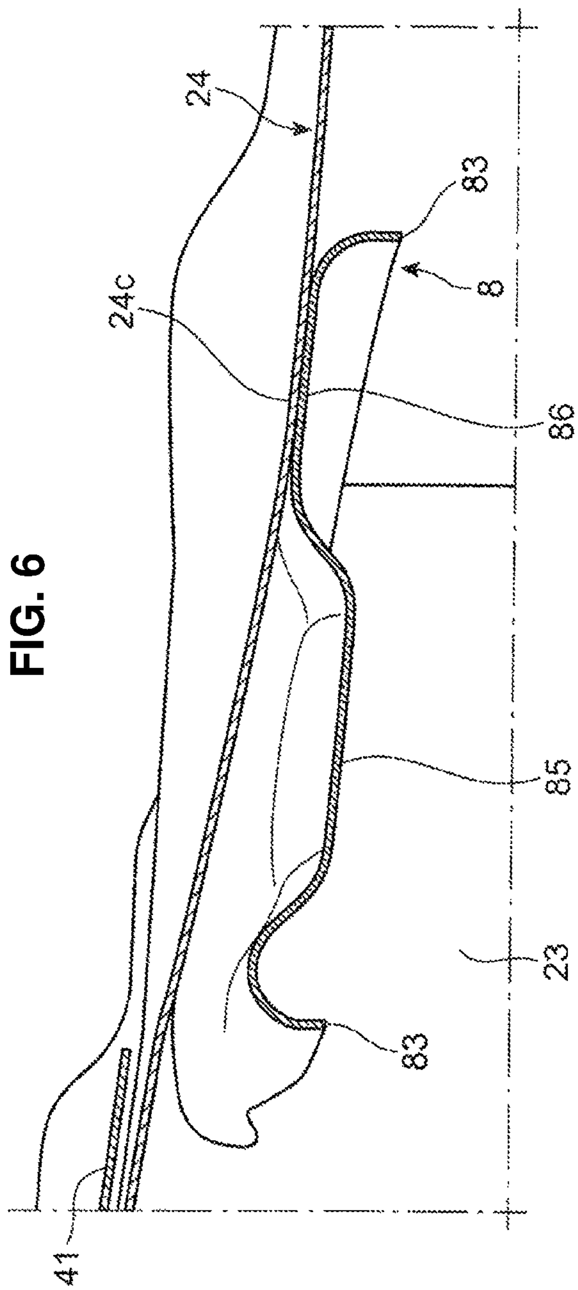
FIG. 6 is a sectional view taken along line C-C of FIG. 3.

Further, as shown in FIGS. 3 and 6, the flat face portion 24*c* is provided at the side face portion 24*a* of the hinge pillar reinforcement 24, a flat-face joint portion 86 is provided at the base face portion 81 of the reinforcing member 8 at a position which corresponds to the flat face portion 24*c* of the hinge pillar reinforcement 24, and the flat face portion 24*c* of the hinge pillar reinforcement 24 and the flat-face joint portion 86 of the reinforcing member 8 are joined by welding. Thereby, the surface rigidity (facial rigidity) of the flat face portion 24 of the hinge pillar reinforcement 24 which is even and has a low rigidity is increased.

Next, the operations and effects of the side vehicle-body structure of the vehicle according to the above-described embodiment will be described.

Figure 7A:
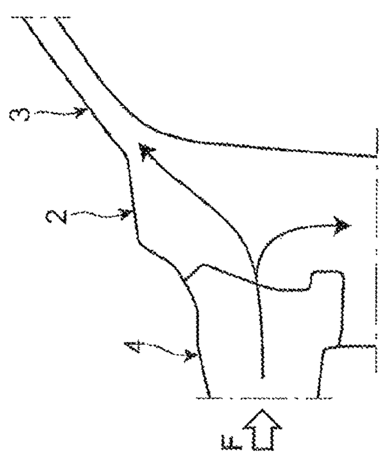
FIGS. 7A, 7B and 7C are explanatory diagrams showing a major part of the side vehicle-body structure in states before and after a load is inputted from a vehicle forward side.
Figure 7B:
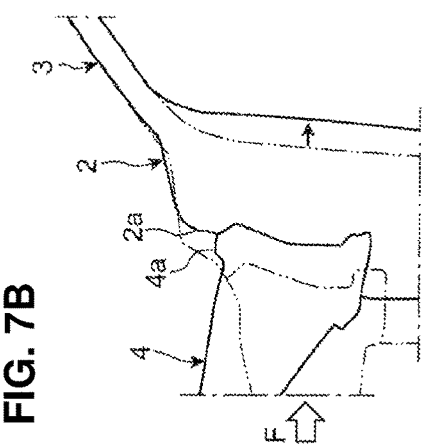
Figure 7C:
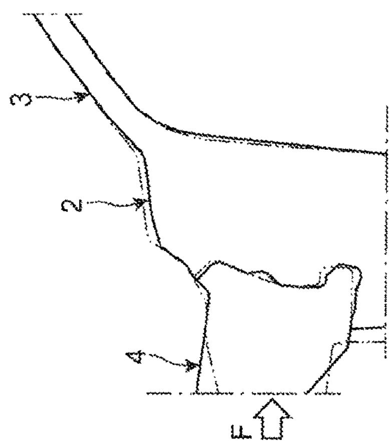
Figure 7D:
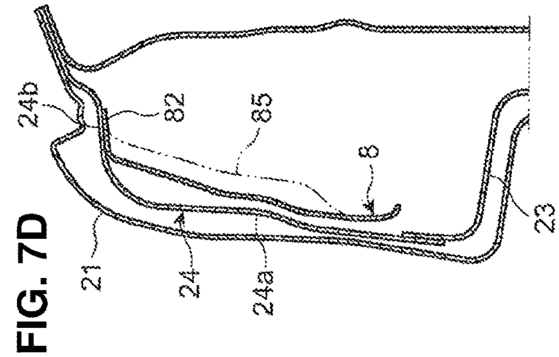
FIGS. 7D, 7E and 7F are sectional views taken along line D-D of FIG. 3 in the states before and after the load is inputted from the vehicle forward side.

Herein, FIGS. 7A, 7B and 7C show a connection portion of the apron member 4, the hinge pillar 2, and the front pillar 3 in the side vehicle-body structure of the vehicle, FIG. 7A showing a state before the load is inputted from the vehicle forward side, FIGS. 7B and 7C showing a state after the above-described load is inputted. FIG. 7B shows a case where the reinforcing member of the present invention is not provided, and FIG. 7C shows a case where the reinforcing member of the present invention is provided. Herein, FIGS. 7D, 7E and 7F show sectional views taken along line D-D of FIG. 3, which respectively correspond to FIGS. 7A, 7B and 7C.

As shown by an arrow in FIG. 7A, a load F inputted from the vehicle forward side is transmitted to the hinge pillar 2 and the front pillar 3 from the apron member 4.

First, deformation moves of the respective portions (the apron member 4, the hinge pillar 2, and the front pillar 3) in the case of the load F being inputted to the vehicle body according to a conventional side vehicle-body structure of the vehicle will be described. As shown by a solid line in FIG. 7B, when part of the load F is inputted to the apron member 4, the apron member 4 has folding deformation such that a vehicle-body forward side of the apron member 4 is raised upward and the rear end portion 4*a* of the apron member 4 is sunk downward. Thereby, deformation occurs such that the upper face portion 2*a* of the hinge pillar 2, to which the rear end portion 4*a* of the apron member 4 is connected, is sunk downward.

Figure 7E:
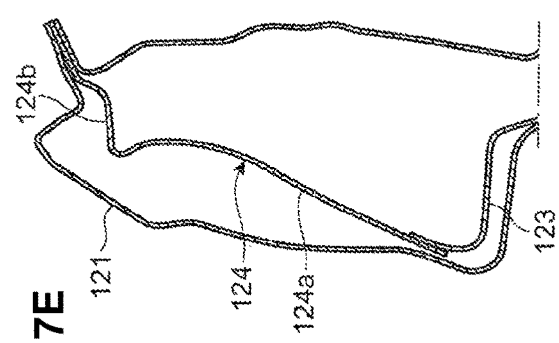
Figure 7F:
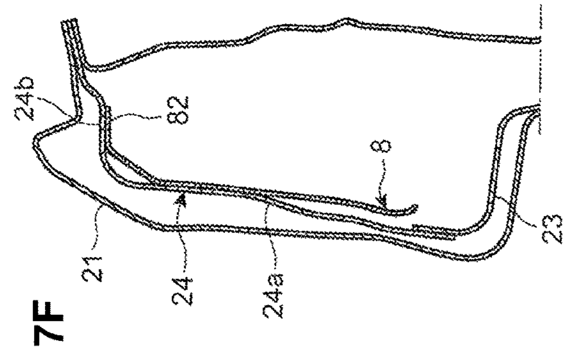

Specifically, as shown in FIG. 7E, deformation occurs such that an upper face portion 124*b* of a hinge pillar reinforcement 124 is sunk downward and a side face portion 124*a* of the hinge pillar reinforcement 124 protrudes toward the cabin inside. Consequently, as shown by a solid line in FIG. 7B, the front pillar 3 has folding deformation and retreats toward the cabin inside. Herein, an imaginary line in FIG. 7B shows the state (FIG. 7A) of the respective portions in a state before the above-described load is inputted.

Next, deformation moves of the respective portions (the apron member 4, the hinge pillar 2, and the front pillar 3) in the case of the load F being inputted to the vehicle body according to the above-described embodiment of the present invention will be described specifically. As shown in FIG. 7F, since the reinforcing member 8 which interconnects the upper face portion 24*b* and the side face portion 24*a* of the hinge pillar reinforcement 24 is provided, the rigidity of the hinge pillar reinforcement 24 is increased. Consequently, even in the case where part of the load F is inputted to the apron member 4, the deformation of the upper face portion 24*b* of the hinge pillar reinforcement 24 being sunk downward is suppressed, so that it is also suppressed that deformation occurs such that the side face portion 24*a* of the hinge pillar reinforcement 24 protrudes toward the cabin inside. Accordingly, as shown by a solid lien in FIG. 7C, it is suppressed that the front pillar 3 has folding deformation and retreats toward the cabin inside. Herein, an imaginary line in FIG. 7C shows states of the respective portions before the above-described load input.

As shown in FIG. 7D, since the bead portion 85 which protrudes toward the cabin side and interconnects the upper face portion 24*b* and the side face portion 24*a* of the hinge pillar reinforcement 24 in the brace shape is formed at the reinforcing member 8, the load which causes the upper face portion 24*b* of the hinge pillar reinforcement 24 to be sunk downward is received in the brace manner. Accordingly, the rigidity of the hinge pillar reinforcement 24 against the load inputted to the upper face portion 24*b* of the hinge pillar reinforcement 24 is increased, so that the sectional collapse, in the vehicle front view, of the hinge pillar reinforcement 24 is suppressed as shown in FIG. 7F.

Moreover, since the flat face portion 24*c*, which is even and the low rigidity, of the hinge pillar reinforcement 24 and the flat-face joint portion 86 of the reinforcing member 8 are welded together, the surface rigidity of the flat face portion of the hinge pillar reinforcement 24 is increased. Consequently, it is suppressed that the flat face portion 24*c* of the hinge pillar reinforcement 24 which has the low surface rigidity becomes a trigger of the above-described deformation such that the side face portion 124*a* of the hinge pillar reinforcement 124 protrudes toward the cabin side as shown in FIG. 7E.

Figure 8B:
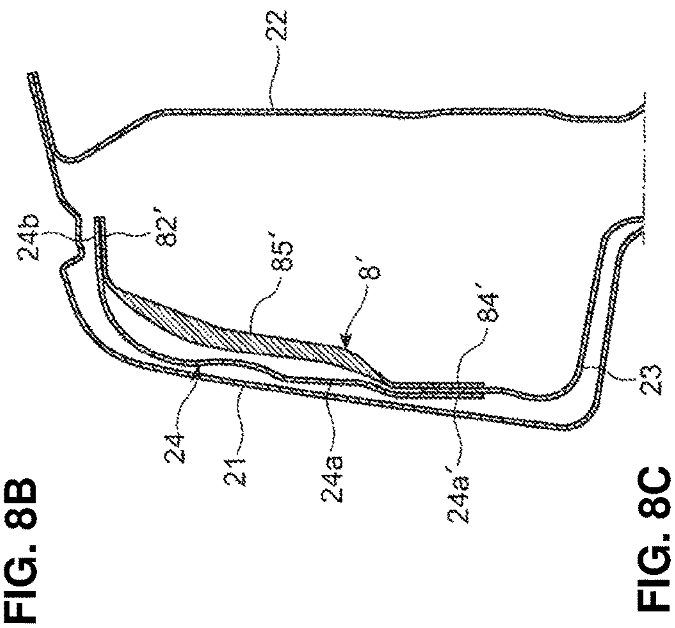
FIGS. 8A, 8B and 8C are views of a side vehicle-body structure according to a second embodiment of the present invention, FIG. 8A being the view which corresponds to FIG. 3, FIG. 8B being the sectional view taken along line E-E of FIG. 8A, and FIG. 8C being the sectional view taken along line F-F of FIG. 8A.
Figure 8C:
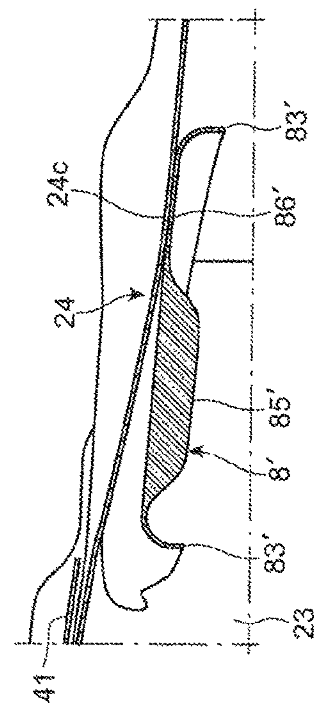

A side vehicle-body structure of the vehicle according to a second embodiment will be described referring to FIGS. 8A, 8B and 8C. Herein, the same reference characters are used for the same components of the second embodiment shown in FIGS. 8A, 8B and 8C as those of the above-described first embodiment shown in FIG. 3, specific descriptions of which are omitted here.

The shape of the high-rigidity portion of a reinforcing member 8' is different from that of the first embodiment. Herein, the other structure is the same as the first embodiment, and the same effects as the first embodiment can be provided.

The side vehicle-body structure of the vehicle according to the second embodiment comprises, similarly to the first embodiment, the hinge pillar 2 which is provided at the side face portion of the vehicle body 1, the front pillar 3 which is connected to the upper end portion of the hinge pillar 2, the apron member 4 which extends forward from the joint portion of the hinge pillar 2 to the front pillar 3, and a pillar reinforcement 24 which is provided at the joint portion of the hinge pillar 2 to the front pillar 3. Herein, while the reinforcing member 8' which connects the side face portion 24*a* and the upper face portion 24*b* of the hinge pillar reinforcement 24, this reinforcing member 8' of the second embodiment has a thick portion 85' which protrudes toward the cabin side. The reinforcing member 8' is made of an aluminum material, for example.

Figure 8A:
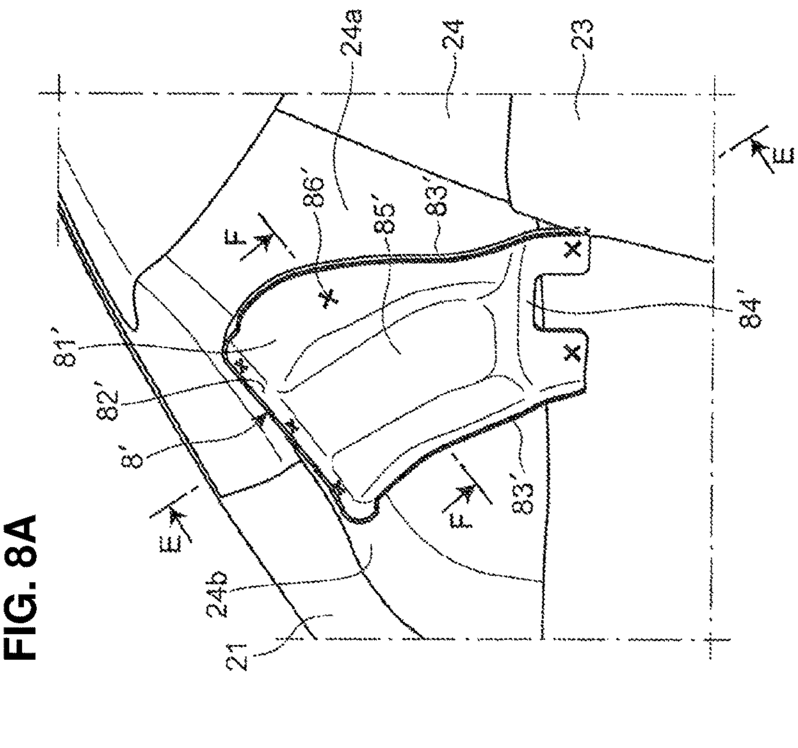

As shown in FIG. 8A, the reinforcing member 8' comprises a base face portion 81' and an upper face portion 82' which rises roughly vertically from an upper end portion of the base face portion 81', which is formed in the roughly L shape by these portions 81', 82'. Further, flange portions 83', 83' are provided to rise toward the cabin side at both sides, in the vehicle-body longitudinal direction, of the base face portion 81', and the flange portions 83', 83' and the above-described upper face portion 82' are configured to be a continuous face.

The thick portion 85' which protrudes toward the cabin side is formed at a portion of the base face portion 81' of the reinforcing member 8' which is located between the both-side flange portions 83', 83' of the reinforcing member 8' over an area from the upper face portion 82' of the reinforcing member 8' to the lower end portion 84' of the reinforcing member 8'.

Further, similarly to the bead portion 85 of the reinforcing member 8 of the first embodiment, the thick portion 85' of the reinforcing member 8' is provided to protrude toward the cabin side between a joint portion of the upper face portion 82 of the reinforcing member 8' to the upper face portion 24*b* of the hinge pillar reinforcement 24 and a joint portion of the lower end portion 84' of the reinforcing member 8' to the lower end portion 24*a'* of the side face portion 24*a* of the hinge pillar reinforcement 24. Thereby, the thick portion 85' of the reinforcing member 8' receives, in the brace manner, the load inputted to the upper face portion 24*b* of the hinge pillar reinforcement 24, for example. That is, the rigidity of the hinge pillar reinforcement 24 against the load inputted to the upper face portion 24*b* of the hinge pillar reinforcement 24 is increased, so that the sectional collapse, in the vehicle front view, of the hinge pillar reinforcement 24 is suppressed.

Thereby, the deformation of the hinge pillar reinforcement 24 can be suppressed, and also the folding deformation of the front pillar 3 can be suppressed, so that the bad influence of the front pillar 3 on the cabin inside can be suppressed.

The present invention should not be limited to the above-described embodiments and any other modifications or improvements may be applied within the scope of a spirit of the present invention.

What is claimed is:

1. A side vehicle-body structure of a vehicle, comprising:

a hinge pillar provided at a side face portion of a vehicle body and extending in a vertical direction;

a front pillar extending upward from an upper end portion of the hinge pillar;

an apron member extending forward from a joint portion of the hinge pillar to the front pillar; and a pillar reinforcement provided at the joint portion of the hinge pillar to the front pillar, wherein said pillar reinforcement is formed in a roughly L shape by a side face portion extending vertically and an upper face portion extending toward a cabin side from an upper end of the side face portion, and a reinforcing member which connects said upper face portion and said side face portion of the pillar reinforcement is provided.

2. The side vehicle-body structure of the vehicle of claim 1, wherein said reinforcing member has a portion which interconnects the upper face portion and the side face portion of said pillar reinforcement.

3. The side vehicle-body structure of the vehicle of claim 2, wherein said portion of the reinforcing member is a bead portion which interconnects the upper face portion and the side face portion of said pillar reinforcement.

4. The side vehicle-body structure of the vehicle of claim 2, wherein said portion of the reinforcing member is a thick portion which interconnects the upper face portion and the side face portion of said pillar reinforcement.

5. The side vehicle-body structure of the vehicle of claim 1, wherein the side face portion of said pillar reinforcement has a flat face portion, and said reinforcing member comprises a flat-face joint portion which is joined to said flat face portion of the pillar reinforcement.

6. The side vehicle-body structure of the vehicle of claim 2, wherein the side face portion of said pillar reinforcement has a flat face portion, and said reinforcing member comprises a flat-face joint portion which is joined to said flat face portion of the pillar reinforcement.

7. The side vehicle-body structure of the vehicle of claim 3, wherein the side face portion of said pillar reinforcement has a flat face portion, and said reinforcing member comprises a flat-face joint portion which is joined to said flat face portion of the pillar reinforcement.

8. The side vehicle-body structure of the vehicle of claim 4, wherein the side face portion of said pillar reinforcement has a flat face portion, and said reinforcing member comprises a flat-face joint portion which is joined to said flat face portion of the pillar reinforcement.

* * * * *